United States Patent [19]

Krug et al.

[11] Patent Number: 4,806,140
[45] Date of Patent: Feb. 21, 1989

[54] ADJUSTABLE PRESS FACE

[75] Inventors: George C. Krug, Newry; Donald J. Beeler; David C. Plank, both of Altoona; Robert W. Sitman; Walter F. Shauf, both of Bellwood; Robert F. Pike, Altoona, all of Pa.

[73] Assignee: PPG Industries, Inc., Pittsburgh, Pa.

[21] Appl. No.: 135,901

[22] Filed: Dec. 21, 1987

[51] Int. Cl.$^4$ .............................................. C03B 23/023
[52] U.S. Cl. ......................................... 65/290; 65/287; 65/273
[58] Field of Search ................. 65/290, 291, 287, 107, 65/106, 273; 403/360, 167, 118

[56] References Cited

U.S. PATENT DOCUMENTS

| | | | |
|---|---|---|---|
| 883,997 | 4/1908 | Willoughby | 403/360 |
| 1,569,015 | 1/1926 | Hays | 403/118 X |
| 2,833,576 | 5/1958 | Cirone | 403/360 X |
| 3,682,613 | 8/1972 | Johnson et al. | 65/289 |
| 4,018,589 | 4/1977 | Egbert et al. | 65/287 |
| 4,052,185 | 10/1977 | Kolakowski | 65/106 |
| 4,187,095 | 2/1980 | Frank | 65/104 |
| 4,210,435 | 7/1980 | Claassen | 65/106 |
| 4,274,858 | 6/1981 | Claassen et al. | 65/273 |
| 4,319,907 | 3/1982 | Pike | 65/106 |
| 4,579,577 | 4/1986 | Claassen | 65/273 |
| 4,662,925 | 5/1987 | Thimons et al. | 65/104 |

Primary Examiner—Arthur Kellogg
Attorney, Agent, or Firm—Andrew C. Siminerio

[57] ABSTRACT

An adjustable shaping mold is provided with an externally positioned adjusting arrangement. All adjustments to the curved configuration of the shaping surface of the mold are done without having to adjust any portion of the adjusting mechanism that is positioned between the flexible shaping member and rigid mounting plate of the mold.

19 Claims, 2 Drawing Sheets

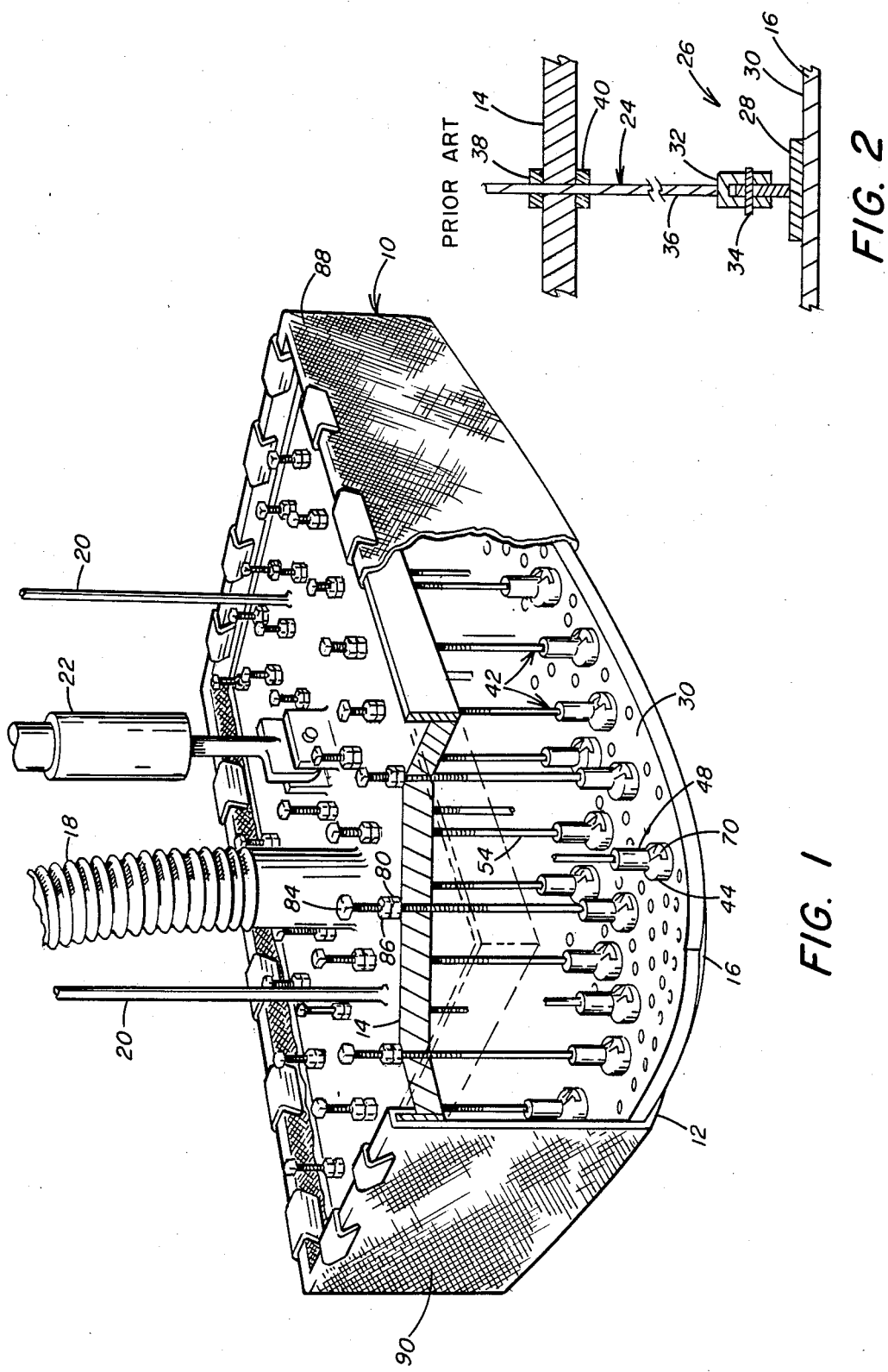

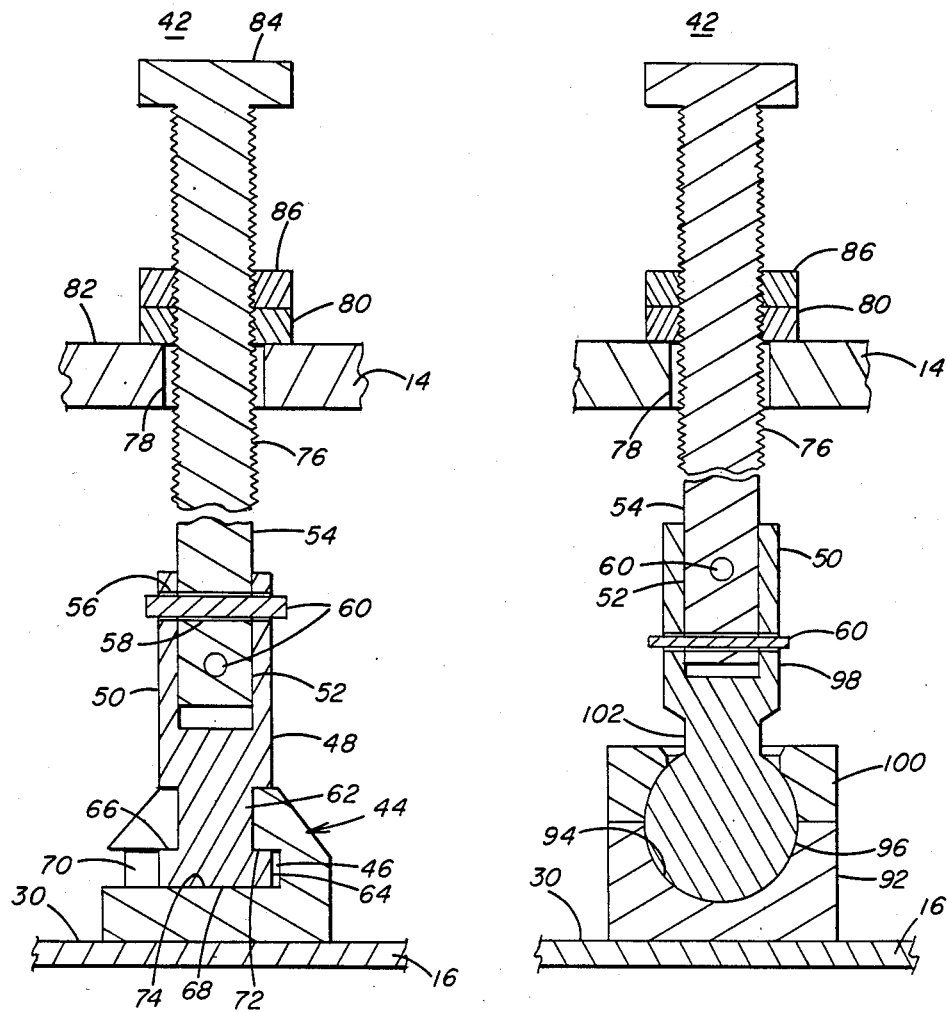
FIG. 3
FIG. 4
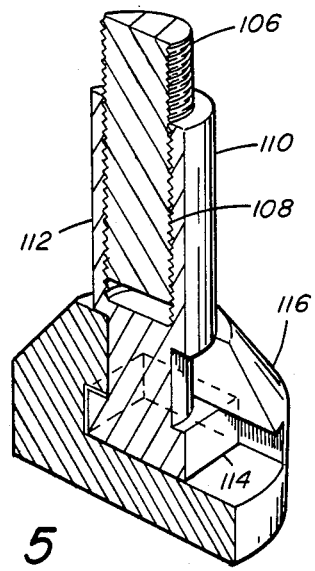
FIG. 5

ADJUSTABLE PRESS FACE

BACKGROUND OF THE INVENTION

1. Field of the Invention

This invention relates to the shaping of heat formable material such as heated glass sheets and more particularly to an adjustable press arrangement.

2a. Technical Considerations

Shaped glass sheets are widely used as windows for vehicles such as automobiles and the like. In the fabrication of these windows flat glass sheets are shaped to precisely defined curvatures dictated by the shape and outline of the frames within which the windows are installed. It is important that these windows meet stringent optical requirements and that they be free of optical defects that would tend to interfere with the clear viewing therethrough in the viewing area. Any distortion in the sheet engaging surface of the shaping members is replicated in the major surface of the shaped sheet and may result in an optically defective product.

Oftentimes the curvatures of automobile windows are similar but not identical. As a result, a different bending mold must be used. The amount of time needed to remove the upper mold for one pattern and install a replacement mold for another pattern of a different configuration is considerable and interferes with time that could be used in production. In addition, during heating and shaping of the glass sheets, the mold's press face may warp due to the relative expansion of the materials forming the mold under such a thermal condition. As a result, minor changes in the heated press face configurations may be required to correct for loss of desired curvature. Therefore it is desirable to have a shaping mold capable of producing multiple patterns of different curvature as well as providing an adjustment mechanism that allows for accurate adjustments to the press face.

It is common practice to use an adjustable press face with a flexible pressing surface adjustably secured to a rigid adjusting plate. Bolt and clevice arrangements are welded to the rear facing surface of the press face and extend through a rigid adjusting plate. A pair of nuts positioned on opposite sides of the rigid adjusting plate are used to vertically move the bolt and, in turn, the press face, and lock the adjusted configuration in place. This type of press adjustment arrangement requires adjusting internal portions of the shaping mold, i.e., making adjustments between the press face and the rigid adjusting plate.

It would be advantageous to construct a shaping mold with an adjustable shaping surface wherein all the adjustments are made external to the mold.

2b. Patents of Interest

U.S. Pat. Nos. 3,682,613 to Johnson et al, 4,052,185 to Kolakowski, 4,210,435 to Claassen, 4,274,858 to Claassen et al. and 4,319,907 to Pike disclose press bending mold arrangements. The press faces are metal plates covered with a flexible, heat insulating material that will not harm the glass sheets at elevated temperatures. Adjusting bolts are interposed between the shaping surface and a rigid metal back plate used to reinforce the mold face. A pair of adjusting nuts are positioned along the adjusting bolt on opposite sides of the rigid metal back plate.

U.S. Pat. No. 4,579,577 to Claassen teaches a vacuum mold for shaping hot glass sheets. The mold includes a rigid back plate, a flexible, perforated lower shaping wall and adjustable spacers positioned between the back plate and the shaping wall. Removable side walls are positioned about the perimeter of the mold to seal the mold and form a vacuum chamber.

SUMMARY OF THE INVENTION

The present invention provides a shaping mold with a mold face adjusting arrangement tha permits external adjustment of the mold face. A connector including a base member, collar member and adjusting bolt is positioned between a flexible mold face and a rigid mounting plate with the base member secured to the inner surface of the mold face and the adjusting bolt extending through a threaded nut on the exterior surface of the mounting plate. One end of the collar member is captured within a cavity in the base member and the other end is secured to the adjusting bolt so that rotation of the bolt moves the flexible mold face towards or away from the mounting plate. The bolt extends through the mounting plate so that it can be easily accessed for rotation and subsequent adjustment of the mold face without the need for accessing the connector within the mold, i.e., between the flexible mold face and the rigid mounting plate. As a result, there is no need for disassembling the mold or special tooling to make internal adjustments to the mold.

In one particular embodiment of the invention, the bolt is non-rotatably secured within a sleeve portion of the collar member and the opposing end of the collar member rotates within the cavity the base member. As the bolt is rotated, it moves through the threaded nut, changing the distance between the mold face and the mounting plate. In an alternate embodiment of the invention, the bolt is threaded into the sleeve portion and the collar member is non-rotatably secured to the base member so that rotation of the bolt will move the bolt through the threaded nut as well as slide the sleeve portion of the collar member along the lower end of the bolt.

BRIEF DESCRIPTION OF THE DRAWINGS

FIG. 1 is a fragmentary perspective view of a shaping mold incorporating the features of the present invention.

FIG. 2 is a prior art mold face adjusting arrangement.

FIG. 3 is an enlarged cross-sectional view of the adjusting mechanism illustrated in FIG. 1.

FIG. 4 is a view similar to that shown in FIG. 3 showing an alternate embodiment of the invention.

FIG. 5 is a perspective cross-sectional view of another alternate embodiment of the invention.

DETAILED DESCRIPTION OF THE INVENTION

Although the present invention is shown in use with a glass sheet shaping arrangement, it is understood that it may be used in any shaping operation which requires an adjustable shaping surface. Typical glass sheet heating and shaping arrangements (not shown) are disclosed in U.S. Pat. Nos. 4,187,095 to Frank and 4,662,925 to Thimons et al., which teachings are hereby incorporated by reference and include a heating furnace to heat the sheets to their heat softenable temperature, a shaping station to shape the heat softened glass sheets and a cooling station to controllably cool the shaped glass sheets. The shaping stations generally include a pair of upper and lower shaping molds (not shown) between which the heat softened glass sheet is shaped.

FIG. 1 illustrates a mold 10 incorporating the novel press face adjusting arrangement of the present invention. It should be noted that although the mold 10 illustrated in FIG. 1 is an upper vacuum mold, i.e., a mold with a downwardly facing shaping surface capable of drawing a vacuum to hold a heat softened glass sheet there against, it is understood that the adjusting arrangement of the present invention may be used in any type of shaping mold including, but not limited to, a lower mold construction and/or a non-vacuum type mold.

Referring to FIG. 1, the mold 10 is covered with a refractory cloth 12 such as fiberglass to insulate the glass from the mold 10. The vacuum mold 10 has a rigid upper mounting plate 14 and a flexible apertured lower wall 16. The lower wall 16 conforms with the shape desired for the glass sheet to be shaped. The vacuum mold 10 communicates with a source of vacuum (not shown) through an evacuation conduit 18. The mold 10 is further connected through vertical guide rods 20 to a support frame (not shown) and is vertically moveable via a piston arrangement 22 relative to the frame.

Referring to FIG. 2, in a typical mold face adjusting arrangement as disclosed in U.S. Pat. No. 4,579,577 to Claassen, connectors 24 of an adjustable mold 26 include a T-shaped member 28 welded to the back surface 30 of flexible shaping member 16. Clevice 32 straddles the T-shaped member 28 and is secured thereto by pin 34. Threaded shaft 36 extends through the rigid mounting plate 14 and is secured in place by upper and lower nuts 38 and 40. In order to adjust the shaping surface 16 of such a mold configuration, the mold 26 must be accessed from both the inside of the mold, i.e., between mounting plate 14 and flexible shaping surface 16, as well as the outside of the mold. In particular, lower nut 40 must be accessible so as to be loosened and tightened as required in order to vertically adjust the threaded shaft 36 and thus adjust the shaping surface of flexible member 16.

Referring to FIGS. 1 and 3, a plurality of adjustable connectors 42, which are the subject of the present invention, connect the lower wall 16 of the mold 10 to the upper mounting plate 14. In the particular embodiment of the invention illustrated in FIG. 3, each connector 42 includes an anchor or base member 44 which is secured, for example, by welding to back surface 30 of lower wall 16. Although base 44 is shown to be cylindrical, other shapes may be used, for example, a rectangular block. Base members 44 include a cavity 46 to receive a bolt collar 48. The collar 48 includes a sleeve portion 50 which receives one end 52 of a shaft or bolt 54. Holes 56 in the sleeve portion 50 of collar 48 are aligned with holes 58 through bolt 54. Pin members 60, preferably roll pins, are inserted through holes 56 and 58 to secure the bolt 54 within the sleeve 50. The lower portion of the collar 48 further includes a reduced diameter portion 62 and an enlarged end portion 64 provided with a shoulder areas 66 and 68. The base 44 includes a slot 70 to receive the collar 62 and includes a ledge portion 72 overlapping the end portion shoulder area 66 of collar 48 and support surface 74.

With continued reference to FIG. 3, an upper threaded end 76 of bolt 54 extends from the collar 48 through aperture 78 in mounting plate 14. Threaded nut 80 is welded to the back face 82 of plate 14. Rotation of bolt 54 via head member 84 provides accurate vertical adjustment of the flexible shaping surface 16. If required, an additional lock nut 86 may be positioned on bolt 54 at welded nut 80 to prevent rotation of threaded bolt 54 after any final adjustments.

Although the connection between collar 48 and bolt 54 includes end 52 being received within sleeve portion 50, it is obvious that other collar/bolt connections may be used. For example, end 52 of bolt 54 may have a sleeve portion (not shown) to received and secure an upper end of collar 48 therein.

In the particular embodiment of the invention illustrated in FIG. 1, in order to seal the mold 10 to make it a vacuum mold, the peripheral edge 88 between the mounting plate 14 and flexible shaping surface 16 must be spanned with a heat-resistant, impervious material. Although not limiting in the present invention, the portion 90 of the fiber glass cover 12 spanning between plate 14 and flexible shaping surface 16 may be coated with a heat resistant, silicone rubber, for example, Dow Corning 736 Silastic ® RTV or other heat resistant sealant to prevent air flow therethrough, as taught in U.S. Pat. No. 4,579,577 to Claassen whose teachings are herein incorporated by reference.

In order to adjust the curvature of the flexible shaping surface 16, the lock nut 86 (if used) is loosened, i.e., rotated so as to move away from welded nut 80. Bolt 54 is thereafter rotated so as to move upward or downward through welded nut 80. As bolt 54 is rotated, end portion 64 of collar 48 rotates within the base 44 which is welded to surface 30 of flexible shaping surface 16. As threaded bolt 54 moves upward, shoulder area 44 contacts ledge 72 of the base 44 and biases the shaping surface 16 in the vicinity of the base member 44 upward. As the thread bolt 54 is rotated to move downward, ledge portion 68 of end portion 64 biases against surface 74 of the base member 44, thereby biasing the shaping surface 16 downward. After adjustments are made, lock nut 86 may be retightened.

In the present invention, all adjustments to the shaping surface 16 are external of the mold 10. In the case of a vacuum mold, there is no requirement to remove the side sealing arrangement in order to access the interior of the mold. The present invention also provides easy replacement of the connector 42 components if one of the elements fails. In particular, if bolt 54 were to break or be stripped, pins 60 can be removed, the defective bolt 54 removed, and a new bolt 54 inserted through mounting plate 14 in collar 48. If the collar 48 fails, the bolt 54 may be removed as discussed earlier so that the defective collar may slide out of the base 44 via slot 70. A new collar 48 may be installed by sliding end portion 64 of the collar into the base and reconnecting the bolt 54.

It should be noted that in the particular embodiment of the invention illustrated in FIG. 3, end portion 64 may tend to slide out from base 44 as a result of repeated adjustment to the shaping surface 16. Although not limiting in the present invention, this condition may be prevented for example, by providing a lip (not shown) in slot 70 to limit the outward movement of portion 64.

The connector arrangement as shown in FIG. 3 provides additional bearing surface area and additional strength and less likely to fail than the type of arrangement illustrated in FIG. 2, wherein typical failure modes include shearing of the pin 34 or failure of the T-shaped member 28 or clevice 32 through the hole for pin member 34.

FIG. 4 illustrates an alternate embodiment of the present invention. Base 92 is secured to flexible plate 16 and includes a generally spherical chamber 94 that receives spherical head portion 96 of collar 98. The upper portion 100 of base 92 includes an opening through which reduced diameter portion 102 of collar 98 extends so as to provide connection to bolt 54 in the fashion as discussed earlier. Because head portion 96 is fully enclosed within chamber 94, it cannot slide out of base 92.

FIG. 5 illustrates another embodiment of the present invention. As compared to FIG. 3 wherein bolt 54 is secured in collar 48 by pins 60, bolt 106 in FIG. 5 includes a threaded lower end 108 which is threaded into sleeve 110 of collar 112. In addition, enlarged end portion 114 of collar 112 is non-rotationally secured to the base member 116. In a manner similar to the other embodiments of the invention, the bolt 106 extends through rigid mounting plate and threaded nut (not shown in FIG. 5). In this embodiment of the invention, rotation of the bolt 106 not only will cause bolt 106 to move relative to the rigid mounting plate but will also move the collar 112 along the length of the bolt 106. As a result, there will be more movement of a flexible surface secured to base 116 by this embodiment of the connector as compared to movement of the flexible surface as shown in the embodiments illustrated in FIG. 3 and FIG. 4, and in particular, if the threaded pitch at both ends of bolt 106 is the same, the flexible surface will move twice as much as compared to the embodiments in FIGS. 3 and 4.

It should be appreciated that collar 112 in FIG. 5 may be eliminated so that bolt 106 is received directly by base member 116. However, it should be noted that without the collar arrangement, the bolt cannot be as easily removed from the base member as is the case in FIG. 5.

The forms of the invention shown and described in this disclosure represent illustrative preferred embodiments thereof. It is understood that various changes may be made without departing from the gist of the invention except insofar as defined in the claimed subject matter that follows.

We claim:

1. An adjustable shaping mold comprising:
    a rigid mounting plate;
    a flexible shaping member with a first major surface forming a shaping surface of said mold;
    a plurality of adjustable connectors positioned between said rigid plate and a central zone of said shaping member to maintain a predetermined spaced distance therebetween, each of said connectors including a base member secured to a surface opposite said shaping surface of said shaping member and an adjusting bolt with a first and extending through said rigid plate and an opposing end rotatably secured to said base member;
    means cooperating between said rigid plate and said first end of said bolt to allow for axial adjustment of said bolt relative to said plate; and
    means permitting adjustment of said bolt so as to change said space distance and configuration of said shaping surface of said shaping member wherein said permitting means is positioned outside of said space between said plate and shaping member and further wherein adjustment of said bolt in a first direction displaces said shaping member in a first direction relative to said rigid plate and adjustment of said bolt is a second, opposite direction displaces said shaping member in a second, opposite direction relative to said rigid plate.

2. The mold as in claim 1 wherein said connectors further include a collar member with a first end secured to said opposing end of said adjusting bolt and an enlarged head member at the opposing end of said collar captured within a cavity in said base member.

3. The mold as in claim 2 wherein said cooperating means includes a threaded aperature associated with said plate and said adjusting bolt includes a threaded portion extending through said threaded aperature for rotation therein and further wherein said adjustment means includes means to rotate said bolt within said threaded aperature for axial adjustment of said bolt relative to said plate.

4. The mold as in claim 3 wherein said opposing end of said bolt is non-rotationally secured to said collar and said enlarged head member of said collar is rotationally engaged by said base.

5. The mold as in claim 4 wherein said enlarged head member includes an annular disc member having first and second ledge members and said base member includes a disc member receiving chamber with first and second bearing surfaces that are closely spaced to said first and second ledge portions, respectively, of said disc member wherein rotation of said bolt in a first direction biases said first ledge member against said first bearing surface and rotation of said bolt in a second direction biases said second ledge member against said second bearing surface.

6. The mold as in claim 5 wherein said base includes a slotted opening to removably receive said enlarged head member within said base.

7. The mold as in claim 6 wherein said mold is a vacuum mold and said flexible shaping member is an apertured shaping member, further including means to seal the peripheral edge of said mounting plate with the peripheral edge of said shaping member to form a vacuum chamber, and further wherein said adjusting means is external to said vacuum chamber.

8. The mold as in claim 4 wherein said enlarged head member is a generally spherically shaped member and said base includes a spherically shaped member receiving chamber wherein rotation of said adjusting bolt in a first direction biases said base and said flexible shaping member away from said mounting plate, and rotation of said adjusting bolt in a second direction biases said base and flexible shaping member toward said mounting plate.

9. The mold as in claim 8 wherein said mold is a vacuum mold and said flexible shaping member is an apertured shaping member, further including means to seal the peripheral edge of said mounting plate with the peripheral edge of said shaping member to form a vacuum chamber, and further wherein said adjusting means is external to said vacuum chamber.

10. The mold as in claim 3 wherein said enlarged member is non-rotationally secured within said base and said first end of said adjusting bolt is threadedly secured to said first end of said collar such that rotation of said bolt moves said collar along said bolt.

11. An adjustable connector for adjusting the space between central portions of a flexible plate and a rigid mounting plate comprising:
    an anchor having a chamber and means to permit securing of said anchor to said flexible plate;

a shaft extending from said anchor with a first end rotatably secured said anchor and a second end capable of extending through said rigid mounting plate spaced from said flexible plate;

means positioned along said second end of said shaft to cooperate with said rigid plate to allow for axial adjustment of said shaft relative to said plate; and means to provide for adjusting engagement of said shaft wherein said providing means is positioned outside of the space between said rigid mounting plate and said flexible plate and further wherein adjustment of said shaft in a first direction displaces and flexible plate in a first direction relative to said mounting plate and adjustment of said shaft in a second, opposite direction displaces said flexible plate in a second, opposite direction relative to said mounting plate.

12. The connector as in claim 11 wherein said shaft includes a collar member secured to said first end of said shaft, said collar member having an enlarged head portion captured within said cavity of said anchor.

13. The connector as in claim 12 wherein said cooperating means includes a threaded portion of said shaft rotatable engagable by said plate and said providing means includes means to rotate said shaft for axial adjustment of said shaft relative to said plate.

14. The connector as in claim 13 wherein said shaft is non-rotationally secured to said collar member and said enlarged head portion of said collar member is rotationally captured within said cavity of said anchor.

15. The connector as in claim 14 wherein said enlarged head member is non-rotatably secured within said cavity of said anchor and said shaft is rotationally secured to said collar member such that rotation of said shaft displaces said collar member along said shaft.

16. The connector as in claim 14 wherein said enlarged head member includes an annular disc member having first and second ledge members and said anchor includes a disc member receiving chamber with first and second bearing surfaces are closely spaced to said first and second ledge portions, respectively, of said disc member wherein rotation of said shaft in a first direction biases said first ledge member against said first bearing surface and rotation of said shaft in a second direction biases said second ledge member against said second bearing surface.

17. The connector as in claim 16 wherein said enlarged head member is removably received within said anchor.

18. The connector as in claim 16 wherein said enlarged head member is generally spherically shaped member.

19. An adjustable shaping mold comprising:

a rigid mounting plate having a first major surface and a second major surface opposite said first surface;

a flexible shaping member having a first major surface defining a shaping surface of said mold and a second major surface opposite said shaping surface and in facing relationship to said first surface of said rigid plate;

a plurality of elongated members having a first end portion passing through said rigid plate and a second end spaced from said second surface of said shaping member;

means coupling each of said first end portions of said elongated members with said rigid plate for axial adjustment of said second end of said elongated water relative to said shaping member;

a plurality of base members secured in spaced relation to one another in a central zone of said second surface of said shaping member;

means for connecting ones of said base members to ones of said second end of said elongated members to set the spacing between said rigid plate and said shaping member and to establish the shape of said shaping surface of said shaping member; and means outside of said space between said rigid plate and said shaping member to permit a rotation of said elongated member, wherein said rotation waves said base member and portions of said shaping member relative to said rigid plate to adjust said space between said rigid plate and said shaping member and change the shape of said shaping surface.

* * * * *

UNITED STATES PATENT AND TRADEMARK OFFICE
CERTIFICATE OF CORRECTION

PATENT NO. : 4,806,140
DATED : February 21, 1989
INVENTOR(S) : Robert W. Sitman, Walter F. Shauf, Robert F. Pike It is certified that error appears in the above-identified patent and that said Letters Patent is hereby corrected as shown below:

Claim 1, line 11, delete "and" (sec. occurrence) and insert --end--.

Claim 10, line 3, delete "first" and insert --opposing--.

Claim 11, line 18, delete "and" and insert --said--.

Claim 15, line 2, delete "non-rotatably" and insert --non-rotationally--.

Claim 19, line 17, delete "water" and insert --member--; line 27, after "permit", delete "a"; line 29, delete "waves" and insert --moves--.

Signed and Sealed this

Twenty-sixth Day of June, 1990

Attest:

*Attesting Officer*

HARRY F. MANBECK, JR.

*Commissioner of Patents and Trademarks*